Dec. 25, 1962 W. P. GRAY 3,070,296
CALCULATOR
Filed Feb. 27, 1961 3 Sheets-Sheet 1
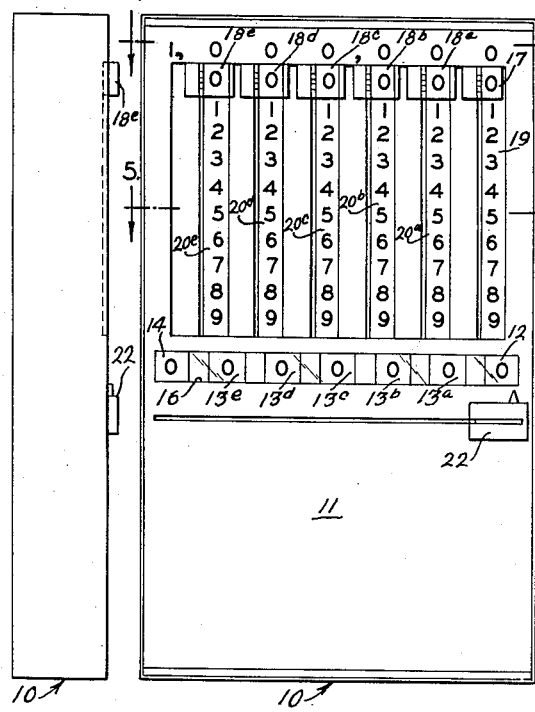
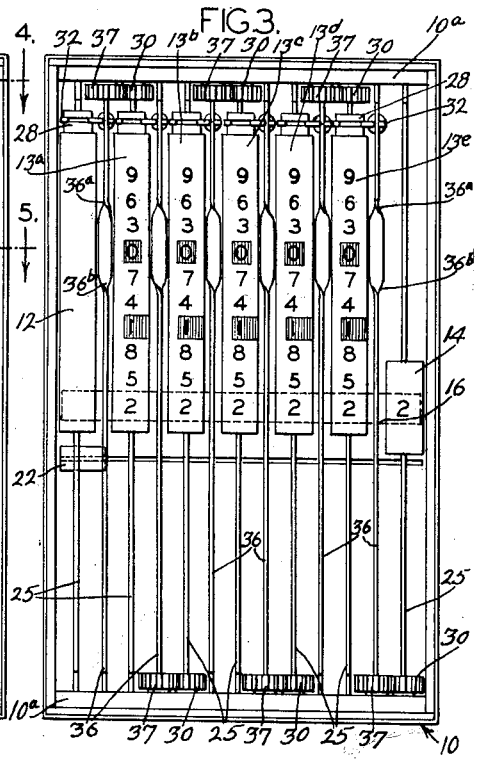
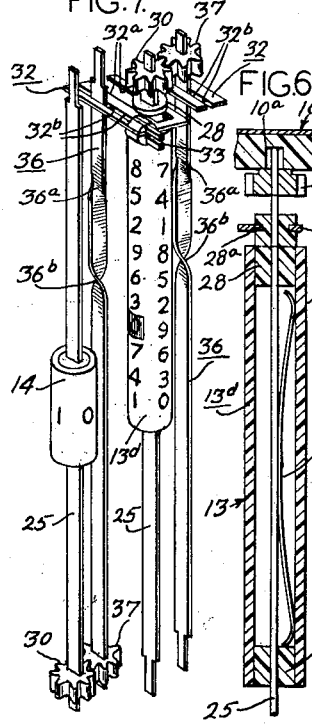
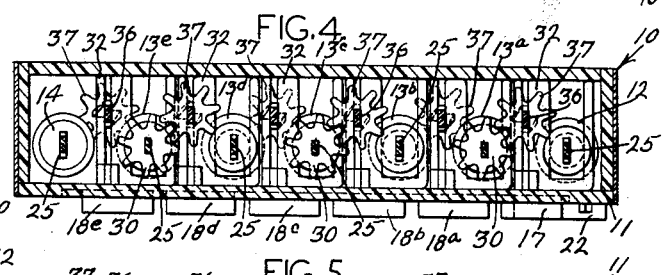
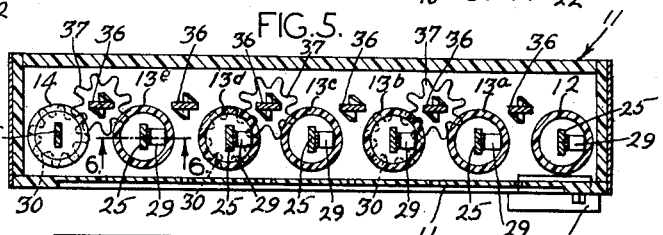
INVENTOR:
WILLIAM P. GRAY
BY
Howson & Howson
ATTYS Dec. 25, 1962  W. P. GRAY  3,070,296
CALCULATOR
Filed Feb. 27, 1961  3 Sheets-Sheet 2

INVENTOR:
WILLIAM P. GRAY
BY Howson & Howson
ATTYS.

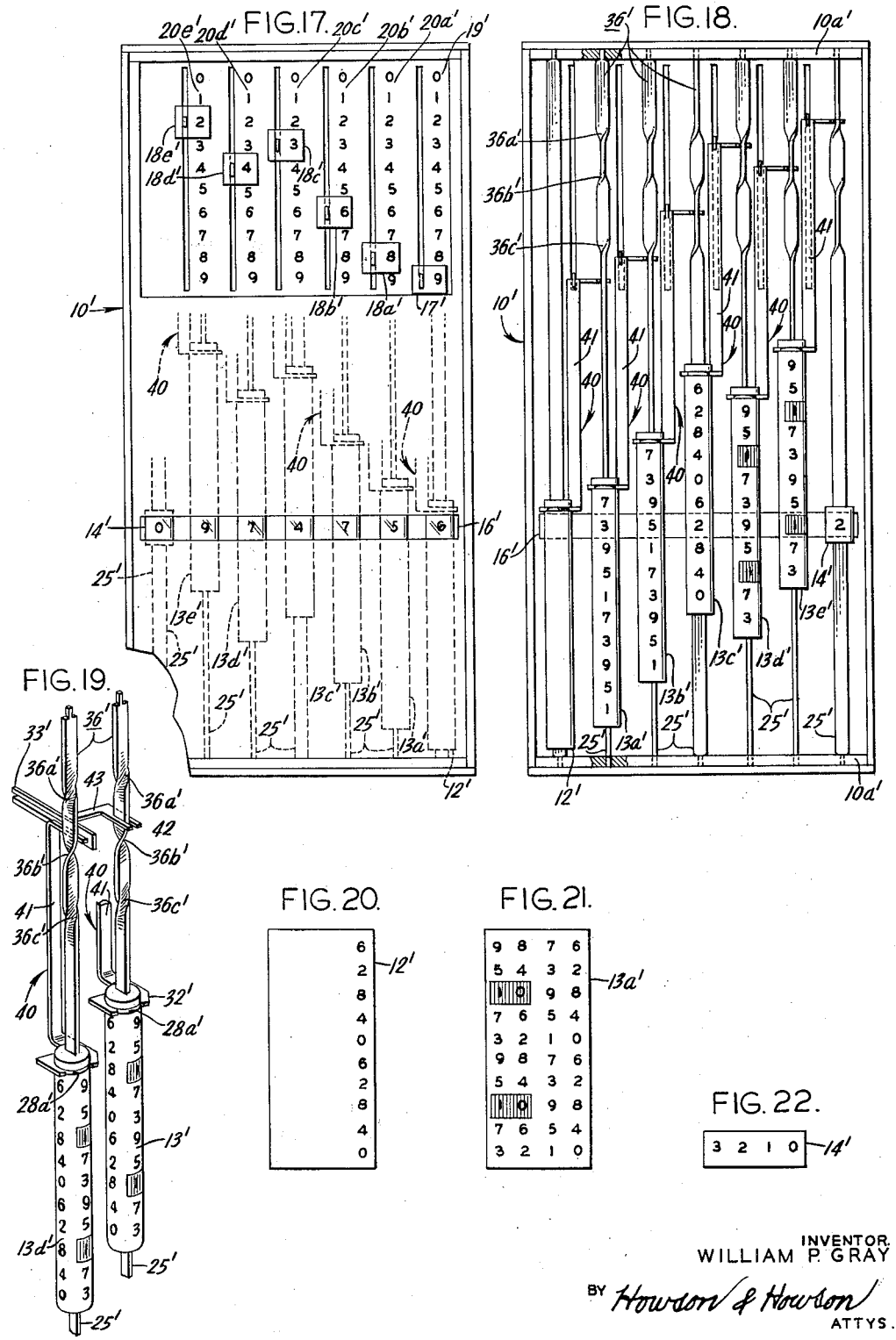

United States Patent Office 3,070,296
Patented Dec. 25, 1962

3,070,296
CALCULATOR
William P. Gray, 2760 B. Green St., Harrisburg, Pa.
Filed Feb. 27, 1961, Ser. No. 91,782
18 Claims. (Cl. 235—73)

This invention relates to a calculator for performing multiplication, division or other multiplication-like mathematical operations whereby a selectable multiplicand is multiplied by a predetermined fixed multiplier.

There are numerous situations in which a simple multiplication by a predetermined fixed multiplier is necessary or desirable. Illustrative of such a situation is the application of a fixed sales tax by sales personnel to the purchase price of goods sold. In such case, the sales tax is frequently a fixed multiplier regardless of the amount of the purchase. For such calculation, a complex machine calculator is economically unjustifiable. However, simple inexpensive mechanisms for doing the calculation are unavailable. Consequently, it has become common practice to employ a tax table and this proves a satisfactory solution in many instances. Use of a table under some circumstances may prove awkward and time consuming and may result in possible error, however, so that a definite need exists for an inexpensive calculator capable of doing this work.

The present invention is directed to a calculator or multiplication device of great simplicity capable of being built sufficiently inexpensively to permit its wide use in the sort of circumstances described. For example, it might well prove desirable for use by sales personnel in department and grocery stores for computing sales tax.

A special problem exists in calculators for performing multiplication and multiplication-like operations. In connection with carry overs, the digits of partial products greater than the units digit must be added to the next partial product. The problem is extremely complicated with multiple digit multipliers and divisors, but where multipliers or divisors are small, particularly when they are smaller than six, I have found that they lend themselves to simplified treatment. In connection with the present invention, I am concerned with small, fixed multipliers. In accordance with the present invention I provide a matrix of potential products for each of the digits of the product. The columns represent the possible numbers selectable for the lowest place digit of the product from zero to nine times the fixed multiplier plus some carry over, which may be zero if there is no carry over. Thus there must be $n+1$ columns where n represents the highest number carried. Going across any given row the last digit of a product of a selected number for that particular digit, say "$a$," will be given plus a carry over, thus $a$, $a+1$, $a+2$ ... $a+n$.

In order to utilize this type of matrix the mechanism employing it must be provided wth two degrees of motion. The first or primary movement must be directed to movement along the columns and is tied directly to the selection of the multiplicand and particularly selection of the corresponding digit in the multiplicand. The second degree of movement along the rows is in response to a carry over action transferred from the next preceding lower place digit.

The specific arrangement of indicators bearing the matrix of potential products is thus subject to considerable variation, but in accordance with the present invention individual indicators for each product digit are provided and have the ability to move relative to a frame which provides means of calibration. Thereby sequential positions of the indicator relative to the frame may be selected to represent a certain number in a particular digit position and the indicator in that position will "read-out" the proper product. Read-out may be accomplished by window means for printed digits or by other suitable means suited to the particular type of number indicia employed on the indicator. No secondary movement is required for the lowest place indicator. An indicator-like member having a secondary movement but no primary movement is also required for the highest place digit of the product which is a place higher than any digit in any potential multiplicand. All other indicators will be provided with both primary and secondary movement. These movements like the kind of indicia and read-out means may vary from one embodiment to another. Similarly the transfer means for causing a lower place digit indicator to induce secondary movement in the next higher place digit indicator may vary from one embodiment to another.

For a better understanding of the present invention two embodiments of the invention are shown in the accompanying drawings, in which FIG. 1 is a front plan view of the calculator employing a multiplier of three;

FIG. 2 is a side elevational view of the calculator of FIG. 1;

FIG. 3 is a back view of the calculator of FIGS. 1 and 2 with the back cover removed;

FIG. 4 is a sectional view taken on the line 4—4 of FIG. 1;

FIG. 5 is a sectional view taken along line 5—5 of FIG.1;

FIG. 6 is a sectional view taken along line 6—6 of FIG. 5;

FIG. 7 is a perspective view showing the next to last and last place or highest place indicator members in the calculator of FIGS. 1–6;

FIG. 8 is a detail view showing a modified preferred form of the indicator arrangement shown in FIG. 1;

FIG. 17 shows a modified and preferred calculator employing a multiplier of 4 in a view similar to that of FIG. 9 showing the calculator adjusted for the multiplicand 243, 689;

FIG. 18 is a back view of the calculator of FIG. 17 with the back cover removed;

FIG. 19 is a perspective view showing a pair of indicator members and their adjusting and transfer mechanism;

FIG. 20 is a developed view of the cylindrical surface of the lowest place indicator in the calculator of FIGS. 17–19;

FIG. 21 is a view similar to FIG. 20 showing the developed surface of the indicators other than the lowest and highest place indicators; and FIG. 22 is a view showing the developed surface of the highest place abbreviated indicator.

Figure 9:
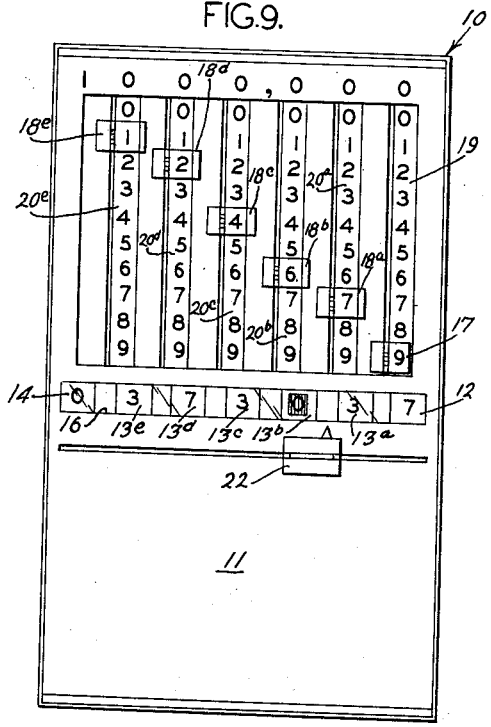
FIG. 9 is a plan view similar to FIG. 1 but showing the calculator adjusted for a selected multiplicand of 124,679.

As mentioned above in reference to the drawings the multiplier for the particular calculator shown in FIGS. 1–16 is three. Referring to FIGS. 1–7, and particularly FIG. 3, it will be seen that the movable parts of this preferred embodiment are supported in an enclosing box structure, generally designated 10, which constitutes a reference frame. This box structure may be constructed of any suitable material such as moulded resin. The box preferably has plain opaque closed side and end walls, a front or top face 11 which will be later described and a plain opaque back or bottom, which in FIG. 3 has been removed. A plurality of rigid indicators each bearing product digit indicia and each capable of being moved to a position indicating the number of a particular digit in the multiplicand corresponding to the product to be displayed are supported on the frame for a primary repeatable movement generally parallel to one another. The indicator 12, which represents the lowest place digit is capable only of this primary movement but the other digit indicators 13a, 13b, 13c, 13d and 13e are each capable of a secondary movement transverse to the primary movement. Finally, a partial indicator 14 capable of the secondary movement but not generally an indicator in the sense of having the parallel primary movement, is provided to display the highest place digit in the product, which has no correspondence with any digit in the multiplicand since it is purely a carry over digit. Number indicia are provided on each indicator arranged in a single column on indicator 12 in the direction of primary movement and in multiple columns (here three) on indicators 13a–13e. This arrangement permits primary movement to bring each number in a particular column successively into cooperating arrangement with the read-out means, here window 16, extending transverse to the direction of primary movement across the otherwise opaque top 11. Secondary movement enables substitution of one column for another in position to be viewed through the window. Each of the indicators 12 13a, 13b, 13c, 13d and 13e is provided with calibration means on the indicator which cooperates with calibrations on the frame or vice versa. As shown in FIG. 1, in this instance, calibration consists of a position pointer, here also a selector, here connected to its indicator through suitable means through a slot in the front cover parallel to the primary direction of movement to show the indicator's primary position. Here the pointed is a transparent selector finger button 17 and 18a, 18b, 18c, 18d, and 18e. Each of these buttons is movable over numbers sequentially arranged from 0 to 9 in a column parallel to the direction of primary movement of the indicator on the front cover 11 of box 10. The transparent finger button is placed opposite the number in the column which is selected for that particular digit of the desired multiplicand. The columns are designated 20e for the 100,000's digit, 20d for the 10,000's digit, 20c for the 1000's digit, 20b for the 100's digit, 20a for the 10's digit and 19 for the units digit. A decimal point may be selected to fall in different positions depending on where it is located in the multiplier and multiplicand, and to that end a decimal point slide 22 is provided.

Figure 10:
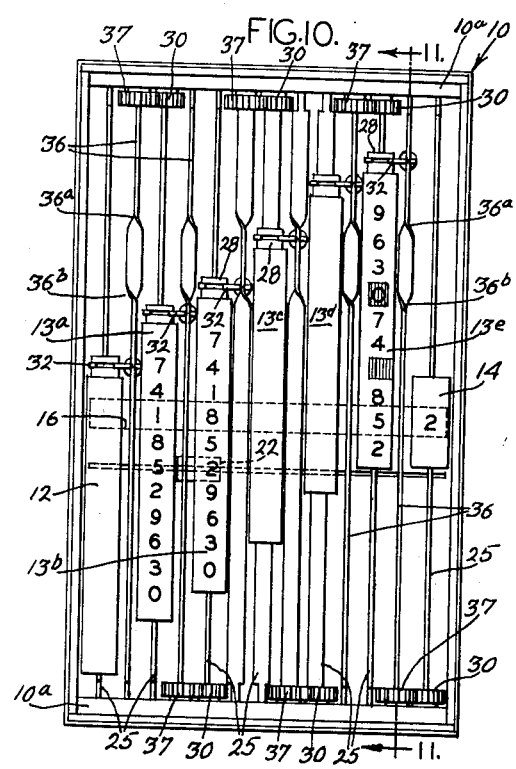
FIG. 10 is a back view similar to FIG. 3 showing the calculator adjusted in the position of FIG. 9.
Figure 11:
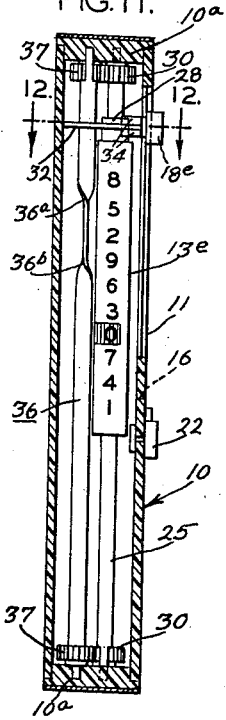
FIG. 11 is a sectional view along line 11—11 of FIG. 10.

The operation may be best understood by reference to FIGS. 9 and 10 which show selector finger buttons, which serve both as calibrating and as selection means, have been positioned to indicate the multiplicand 124,679. Since the multiplier for the device illustrated herein is 3, the product seen through window 16 in front cover 11 is 373,037. As will be explained later, because the digit on indicator 13b is represented differently (here represented as having a red background), there is an indication that a carrying operation which cannot be performed by the device must be performed by the user. More specifically the 3 in the 1000's place on the indicator 13c should be a 4 so that the product of 124,679×3 would correctly read 374,037.

As can best be seen in FIG. 10, the number indicia on each indicator is arranged such that by positioning the finger button attached to that indicator above a number in the column on the cover representing the corresponding digit in the multiplicand, the number indicia on the indicator representing the lower digit in product of three times the digit of the multiplicand will be seen in the window 16.

Transfer means are provided between the indicators whereby numbers carried from one decimal place to the next higher place effect secondary movement in the indicator representing that next higher place to shift from one column of number indicia to another. This transfer mechanism in general may be understood by a study of FIG. 7.

As a practical matter, in the multiplication device illustrated, the indicators are all elongated cylindrical members. These members are advantageously arranged to slide in the direction of their elongation along similar slide bars 25 of rectangular cross section, although any other non-circular cross section whereby turning of the indicator relative to the slide bar is prevented would be satisfactory. The structure of the indicator generally designated 13 in FIG. 6 may be clearly seen in that sectional view. As shown, the structure consists of a tubular member 26 on whose outer surface are printed the columns of numbers, the number indicia seen in FIG. 7, for example. The ends of the tubular member are closed by plugs 27 and 28 which are provided with a rectangular slot of a size just sufficiently large to adequately receive slide bar 25. A leaf spring 29 may be arranged within tubular member 26 to bear against slide bar 25 in case these slots become enlarged to overcome any tendency toward looseness to prevent slipping of member 13 relative to the slide bar. Member 28 may be circumferentially grooved at 28a to receive the coupling for the selector finger button connection to be described hereafter. A gear 30 for coupling back to the next lower place indicator may also be provided on slide bar 25 which is mounted to permit rotation in end bearings or cups 10a.

Figure 12:
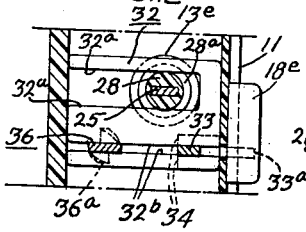
FIG. 12 is a sectional view along line 12—12 of FIG. 11.
Figure 13:
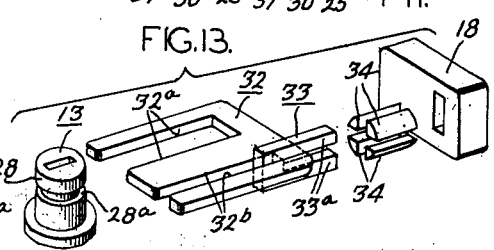
FIG. 13 is an exploded perspective view showing the selector finger button and the associated linkage between it and an indicator for the arrangement of FIGS. 1–12.
Figure 14:
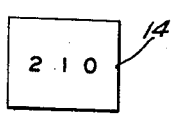
FIG. 14 is a developed view of the cylindrical surface of the highest place indicator of the calculator of FIGS. 1–13.

Coupling between the selector finger button and the respective indicator may be accomplished through an extension of the end plug 28 and specifically its groove 28a as shown in FIGS. 12 and 13. As is clear from FIG. 12, the groove 28a of indicator 13 receives the edges 32a of a slot in plate 32. A separate U-shaped sheet metal clip 33 is supported relative to plate 32 in a second slot whose edges 32b accommodate the thickness of clip 33. The slot of clip 33, in turn, accommodates the thickness of plate 32 so that the members are supported in cruciform cross section perpendicular to one another as best seen in FIG. 13. In this position, they may be held in place by weld fillets 34. The ends 33a of the clip protrude through a slot in the front cover 11 and are embedded in the selector finger button, here generally designated 18. A solid unitary structure permitting longitudinal movement of an indicator 13 along its slide bar 25 is thereby provided, but at the same time rotation of the indicator 13 about its axis is permitted by grooves 28a. The selector finger button in this case is, of course, both a selector and a calibration means but in other instances, it might be possible, for example, to have the indicators or its extension extend through the end wall for the purpose of positioning and observing pointers in the place of the selector finger buttons.

The arrangement shown in FIG. 8 is intended to illustrate how by using colored backgrounds for the various columns, such as blue for columns 19, 20a, 20b and yellow for columns 20c, 20d and 20e, it is possible to identify more clearly the multiplicand selected. This is done by using transparent blue selector finger buttons over the yellow strips, i.e., buttons 17, 18a and 18b, and transparent yellow selector finger buttons over the blue strips, i.e., buttons 18c, 18d and 18e. Then the number selected will appear green over every selected digit of the multiplicand. Other color combinations may, of course, be employed.

Figure 15:
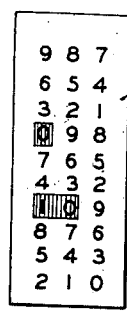
FIG. 15 is a view similar to FIG. 14 showing the developed surface of an indicator typical of indicators other than the lowest or highest place indicators.

Before considering the transfer mechanism in detail, consideration will be given to the way in which the transfer mechanism functions through the secondary movement it produces to perform the carry over function. It will be apparent in consideration of the developed surface of indicator 12 which displays the units digit shown in FIG. 14 that proceeding upward from the bottom in the single column the successive numbers represent the products three times 0, 1, 2, 3, 4, 5, 6, 7, 8 and 9, respectively. However, the tens digit of the products 12, 15, 18, 21, 24 and 27 are not shown. To show them would confuse a viewer looking at the number through the read-out window 16, because the tens digit place has been provided by the adjacent column. Thus, in the situation shown in FIG. 9, since the units digit of the multiplicand is 9, the units digit of the product is 7 and the tens digit must be transferred. The tens digit of the multiplicand is 7 and, if no transfer function were provided, it will be apparent that the digit 1 in the right-hand column third from the top would appear. However, a transfer function and a carry over mechanism is provided in accordance with the present invention through the secondary or rotational movement of tens digit indicator 13a whose developed surface is shown in FIG. 15. The right-hand column of indicator 13a, it will be observed, corresponds to the only column in FIG. 14, and represents the situation in which there is no carry over under consideration. However, in the case under consideration, the tens digit must be 3 since 2 must be carried from the 27 of the units digit. Since it is not possible to determine in advance which product will be selected for the tens digit or any subsequent digit in the multiplicand, it is necessary to provide for all possibilities, a column corresponding to the right-hand column with one added to each number and a similar column with two added to each number. The left-hand column of numbers in FIG. 15 has 2 added to every number corresponding in position to the number shown in the right-hand column. This left-hand column then can be said to represent the product of the selected multiplicand tens digit times 3 plus 2 carried from the units digit. In the same way, had the units digit selected been 2, 5 or 8, only 1 would have been carried instead of 2 and, therefore, the middle column representing the selected multiplicand tens digit times 3 plus 1 is provided.

The operation of the transfer mechanism then is to cause the lower place digit to produce a shift in the indicator by secondary motion of the next higher place digit from a column with no carry over reflected to a column of number indicia which will reflect the number carried in the way shown in FIG. 15. It will be obvious that when other multipliers are employed should 3 be carried at any time, a further column would have to be added to the left. If 4 must be carried, two additional columns would have to be added to the left of those shown in FIG. 15, etc. In short, if the highest number carried is $n$, there must be $n+1$ columns. It will be observed that the transfer mechanism is reversible so that the multiplicand selector can be adjusted in either direction.

One problem exists in the system as illustrated in that, if the number carried is added to the right-hand column shown in FIG. 15, it may cause what was a single digit number to become a two digit number. Although it is possible to provide an overriding linkage to pass this carry over on to the next following digit, such added structure so greatly complicates the structure of my present invention that I prefer in those few instances where this problem occurs to indicate the existence of the problem in some special way so that the user may make a simple correction. In the illustrated embodiment this problem is attacked by providing those numbers where the problem exists with a red background. Ordinarily, I have preferred to use black numbers on a white background. This might be reversed using white numbers on a black background instead of the same black numbers on a red background. Or the indication might be made by showing the digit in its proper place with a very small one in the upper left-hand corner above the digit. All such means of indication are, of course, merely expedients and have nothing to do with the major aspects of the present invention. It will be apparent upon consideration by one skilled in the art that no such indications are required where the multiplicands are either 2 or 5.

Figure 16:
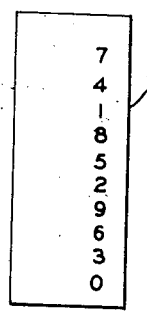
FIG. 16 is a view showing the developed surface of the lowest place abbreviated indicator.

FIG. 16 illustrates in a developed view the special indicator 14 which merely is provided with rotational movement since it has no corresponding digit in the multiplicand. Thus, its only function is to show carry over numbers from the 100,000's digit. Since carry over is indicated by a rotational effect only, the rotational or secondary effect and not the longitudinal or primary effect is required.

As previously indicated, the transfer mechanism is best understood by reference to FIG. 7 wherein it is seen that the side walls 32b of the secondary slot in plate 32 embrace a turn-bar 36 which is provided with transfer spirals 36a and 36b. As can be seen here, if the indicator 13e is moved to the position where the product first has 1 to carry, i.e., 12 in this case, the turn-bar 36 is rotated one-quarter turn as the slot 30 and plate 32 passes over the transfer spiral 36a. Then again, when another unit is to be carried or 2 to be carried, i.e., when 21 is reached in this system, the slot 32b again passes over a transfer spiral 36b and rotates the turn-bar 36 another one-quarter turn. This rotation of turn-bar 36 is transferred from gear 37 on the turn-bar to gear 30 on slide bar 25 which carries indicator 14 and, since the gears in this case have a 1:1 ratio, the slide bar 25 is turned a one-quarter turn each time. Since calibrations are placed 90° apart, each quarter turn brings a new calibration into view, or with most of the indicators each quarter turn brings a new column of calibrations into position so that the numbers in that column can be sequentially viewed as multiplicand numbers are selected for its particular digit.

It will be clear that the gears may be placed at one end or the other of the structure or any place where they do not interfere with the longitudinal movement of the indicators along the slide bars 25. One preferred arrangement is shown in FIGS. 3, 4, 5 and 10 which places alternate pairs of gears at opposite ends to avoid interference of one set of gears with the next.

The operation to produce the numbers shown as a product in FIG. 9 can be visualized from the foregoing description by reference to FIG. 10.

Referring to FIGS. 17–22, a modified counter with a simplified transfer mechanism is illustrated. This mechanism by lengthening the turn-bars enables them to serve as slide bars as well and eliminates the need for gears. As a consequence the total number of bars required may be reduced by almost one-half. In other respects, the structure is quite similar to that of the calculator of FIGS. 1–16 and for this reason corresponding parts have been designated by numbers corresponding to those used for similar parts in the first described embodiment. In addition to physical changes in structure, it will be observed that this calculator provides a multiplicand of 4. Other multiplicands may be substituted by recalibrating to provide sufficient columns on the indicators together with appropriate change in the transfer mechanism to provide $n+1$ positions by secondary movement of the indicator so that each of the $n+1$ columns may be successively viewed.

Referring first to FIGS. 20–22, it will be seen that the lowest place indicator 12' shown in FIG. 20 is provided with a single column just as was indicator 12 of FIG. 16.

FIG. 21 is illustrative of any of the intermediate indicators but has been designated 13a', by way of example. Since the multiplier is 4 and the highest carry over will be 3 (i.e., 4×9=36), the total number of columns required is 4, each successive column adding 1 to the digit in its row in the next column to the left. Again, where carry over would cause appearance of a two digit number in a particular column, only the lower place digit is indicated and provided with red background or one of the alternatives previously described. The highest place indicator 14', as in the previous case, has no primary movement and its secondary movement successively exposes each number in the row shown in FIG. 22.

The differences of structure may be seen in FIGS. 18 and 19. It will be observed that the composite bars are designated 25' since their lower portions provide the slide bars on the FIGS. 1–16 embodiment. Their upper portions, which provide the transfer effect, are designated 36'. The bars are journaled for rotation in the ends 10a' of the enclosing box structure 10' and are provided rotation by virtue of the helical sections 36a', 36b', and 36c'. In this case the helical sections produce rotation of the bars 25' a quarter turn at a time. Three sections provide three turns from the initial position so that the indicators may be positioned in four different rotational positions. If five positions were required, it will be observed that the spiral turns would be four in number and might cause rotation through only one-fifth revolution to successively expose each of five columns. It should be noted that the enclosing box structure 10' is elongated in order to accommodate the longer bars and the multiplicand selector region with its columns 19', 20a', 20b', 20c, 20d' and 20e' and its cooperating finger selector buttons 17', 18a', 18b', 18c', 18d' and 18e is more widely spaced from the window 16' through which the product on the indicators may be viewed. The region of greatest change, however, as previously indicated, is in the transfer mechanism. In other respects, the same remarks applicable to the structure, arrangement and operation of the previously described calculator are largely applicable here.

Referring to FIGS. 18 and 19, the transfer mechanism may be more clearly seen. In this instance, an integral structure generally designated 40 provides a sloted plate 32' which engages a circumferential groove 28a' in the top of each indicator. A clip 33' for engaging the appropriate selector finger button extends through a slot in the front cover of the enclosure 10 and extends generally parallel to the bars 25' and the indicators. A connection link 41 rigidly connects the grooved plate 32' and the clip 33'. In this case, instead of a second slot in plate 32, a separate slotted member 32' is rigidly connected by a strut 43 to the rest of the integral structure 40. The slot in member 42 embraces the transfer portion 36' of the bar 25' and, as it is moved up and down in the orientation shown by means of selector finger button on clip 33 by successively acting on helical portions 36a', 36b' and 36c', it causes the indicator 13e' to rotate successive one-quarter turns, thereby substituting one column for another on the indicator in the position before window 16'. At the same time, the indicator 13d', which produced the carry over effect responsible for the transfer, is raised or lowered in its primary motion to indicate the product of the number selected through clip 33 by the selector finger button. Similar mechanisms are provided between each indicator of the lower place and each transfer mechanism effecting the second position of the indicator of the higher place.

The differences in structure between the structures of FIGS. 1–16 and FIGS. 17–22 are significant primarily in that the cost of production of the latter device is smaller. However, for some applications, a device of the types of FIGS. 1–16 might be preferred. Moreover, devices having different primary and secondary motions and different geometrical configurations might be preferred for some applications where simplicity and economy of construction are not paramount.

It will be appreciated by those skilled in the art that the structures shown are merely by way of example. It is possible, for example, to build a structure in which the primary and secondary motions are reversed, i.e., the primary is rotational and the secondary is lineal or it is conceivable that devices can be made using different types of primary and secondary movement. The transfer function may be accomplished in a great many ways other than the way shown and this is intended to be merely by way of example. Similarly, read-out may be accomplished using a different type or arrangement of windows or by using sensing means adapted to the different types of number indicia employed on the indicators. All modifications in the structure described are intended to be within the scope of the present invention.

It will also be appreciated that the structure can be modified for any desired multiplier or the structure may be reversed to show a division application wherein the product corresponds to the dividend and the multiplicand to the quotient. In this latter case the multiplier corresponds to the divisor. Other mathematical operations of a multiplication type are also contemplated. All such modifications both as to type of operation performed and as to the multiplier size are within the scope of the invention.

I claim:

1. A calculator for multiplying or performing mathematical operations analogous to multiplying a selectable multiplicand by a predetermined multiplier comprising a reference frame, a plurality of digit indicators each capable of representing a particular digit in the product, said indicators supported relative to the frame for a primary repeatable movement, indicators other than the indicator representing the lowest place digit having at least primary and secondary read-out positions and having a secondary movement transverse to the primary movement to shift the indicator from one read-out position to another, read-out means on the frame for each indicator, number indicia on each indicator arranged in at least one column defining the primary read-out position parallel to the primary movement so arranged as to be successively brought itno cooperating arrangement with the read-out means by the primary movement, cooperating calibrations on the frame and on each indicator whereby each primary read-out position of each indicator is calibrated in terms of a digit of the multiplicand corresponding to that of the digit of the product read-out, and transfer means between the indicators whereby numbers carried from one decimal place to the next higher effect secondary movement of the next higher indicator from one read-out position to another representing that next higher place by shifting from one column of number indicia to another.

2. The calculator of claim 1 in which a special indicator for indicating a higher place digit than the highest place digit of the multiplicand and is provided with only secondary movement.

3. The calculator of claim 2 in which the number indicia are numbers arranged in columns along the direction of primary movement and in which the read-out means are windows into confronting relationship with which the indicator means may be brought.

4. The calculator of claim 3 in which the calibration means includes finger operating means whereby the indicators may be positioned to indicate any selected multiplicand.

5. The calculator of claim 4 in which the primary movement is linear and the secondary movement is rotational.

6. A calculator for multiplying or performing mathematical operations analogous to multiplying a selectable multiplicand by a predetermined multiplier comprising a reference frame a plurality of elongated digit indicators, each capable of representing a particular digit in the product, said indicators slidably supported relative to the frame parallel to one another for slidable movement in the direction of elongation, said indicators other than the indicator representing the lowest place digit also being supported for rotational movement transverse to the direction of its sliding movement, a window read-out means for each indicator, at least one column of numbers on each indicator parallel to the direction of sliding movement and so arranged as to be successively brought into view through the window by said sliding movement, cooperating calibrations on the frame and on each indicator whereby each position of each indicator which permits a digit to be read corresponds to a digit of the multiplicand indicated by the calibrating means and transfer means between the indicators whereby numbers carried from one decimal place to the next higher produces rotational movement in the indicator representing that next higher decimal place to shift that indicator so that primary movement displays a different column of numbers.

7. The calculator of claim 6 in which a special indicator for indicating a higher place digit than the highest place digit of the multiplicand is provided with only secondary movement.

8. The calculator of claim 7 in which the indicators are cylindrical in form having parallel movement in the axial direction of elongation and rotational movement about their axes.

9. The calculator of claim 8 in which the cooperating calibrations on the frame and on each indicator are also the means for selecting the digits of the multiplicand.

10. The calculator of claim 8 in which the columns on the cylinders are sufficiently separated from one another so that when one is positioned to be viewed through the window the others are not clearly visible the arrangement being such that a single window transverse to all indicators is provided.

11. The calculator of claim 9 in which the calibration and selection means is movable relative to a numbered scale on the frame and is connected directly to the indicator.

12. The calculator of claim 11 in which the indicator selector means are transparent members movable over numbers representing digits of the multiplicand and in which the color of the transparent members is such that the combination with a color background for the multiplicand digit scale a different color will be produced over the selected digit.

13. The calculator of claim 11 in which parallel multiplicand columns are grouped to provide at least two different background colors and in which the transparent member for each column is of a color that in combination with its multiplicand background color will produce a color common to all selected multiplicand digits.

14. The calculator of claim 10 in which the indicators beyond the lowest decimal place are coupled back to the previous lower decimal place indicator by a transfer means consisting of a guide participating in sliding movement but not rotational movement of the indicator, a turn-bar having special transfer points actuated by the guide to produce rotation movement of the next higher place indicator.

15. The calculator of claim 14 in which each indicator other than the highest place indicator slides in the direction of its primary movement on a slide bar of non-circular cross section, the slide bars are arranged to be rotated by the transfer means to produce secondary movement of the indicator, a rotatable turn bar for each indicator provided with transfer points affected by the indicator in the next lower decimal place, and gear means coupling the turn bar and the slide bar together so that rotation of the turn bar produces rotation of the slide bar.

16. The calculator of claim 15 in which those digits in a particular column which represent a number which would normally require carry over but which the system is incapable of disposing of in that manner are differentiated from the other numbers.

17. The calculator of claim 10 in which the indicators beyond the lowest decimal place are coupled back to the previous lower decimal place indicator by transfer means including special transfer points on the slide bar for the indicator, a coupling on the lower place indicator causing it to follow the primary movement without following the secondary movement, a member cooperating at the transfer points on the slide bar and rigid means interconnecting the coupling to the indicator and the means cooperating with transfer points on the slide bar whereby primary movement of the lower decimal place indicator effects secondary movement of the higher place indicator.

18. The calculator of claim 17 in which the transfer points are helical portions on the slide bar arranged to produce an amount of rotation of the indicator member to accomplish the required secondary movement at the appropriate time.

References Cited in the file of this patent
UNITED STATES PATENTS 1,349,081    Middleton _____ Aug. 10, 1920

FOREIGN PATENTS 327,992    Great Britain _____ Apr. 14, 1930
43,940    Switzerland _____ Mar. 20, 1908